Jan. 3, 1933.  A. E. ANDERSON  1,893,347
SYSTEM OF ELECTRIC DISTRIBUTION
Filed June 22, 1931
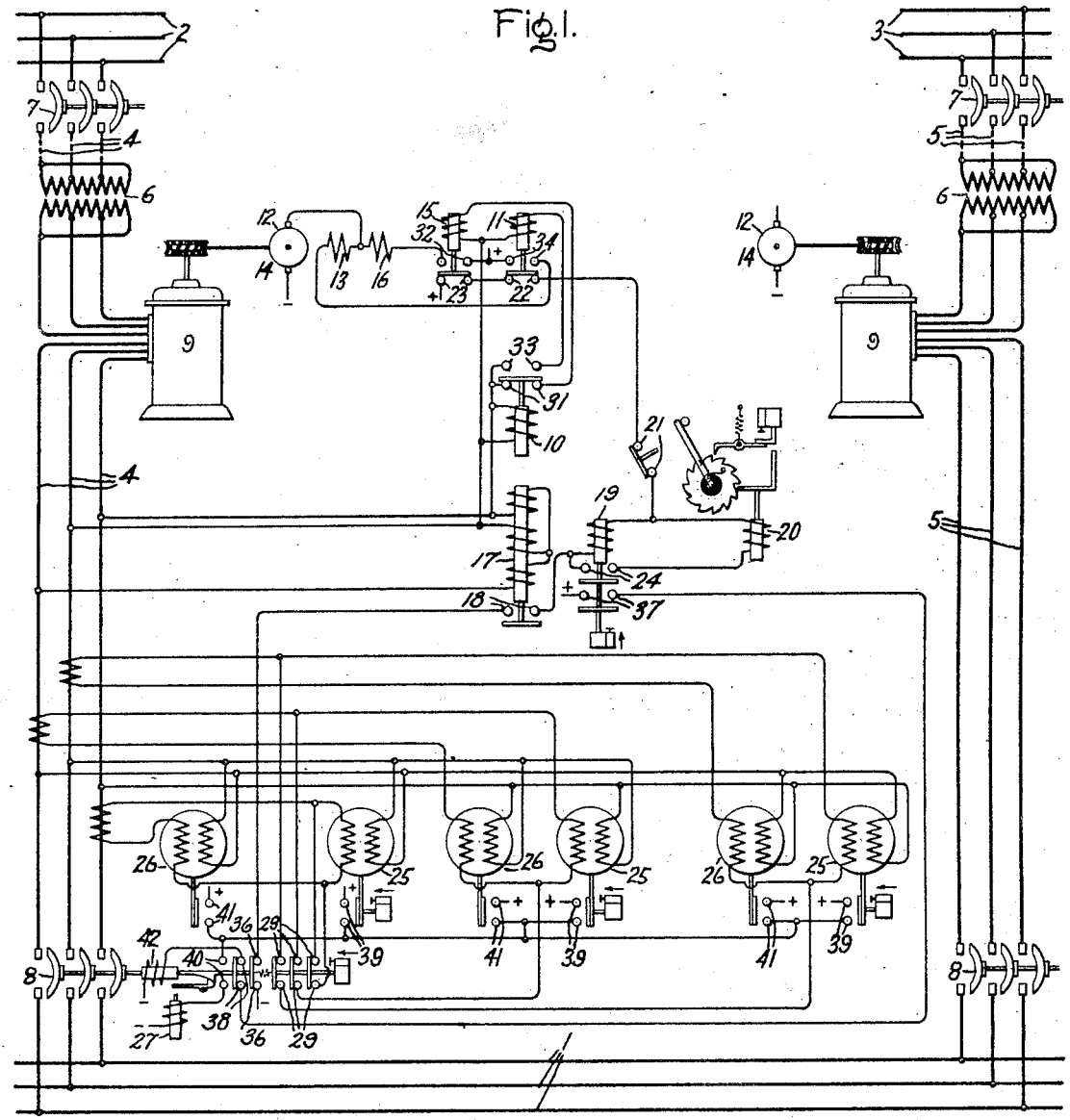
Inventor:
Arvid E. Anderson,
by Charles E. Mullan
His Attorney.

Patented Jan. 3, 1933

1,893,347

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

SYSTEM OF ELECTRIC DISTRIBUTION

Application filed June 22, 1931. Serial No. 545,988.

My invention relates to systems of electric distribution and particularly to systems including an alternating current network and feeder circuits for supplying current thereto at a predetermined voltage and its object is to provide an improved arrangement for controlling in such a system the connection of a feeder circuit to the network and the disconnection of the feeder circuit from the network.

My invention will be better understood from the following description when taken in connection with the accompanying drawing and its scope will be pointed out in the appended claims.

In the accompanying drawing, Fig. 1 illustrates diagrammatically an alternating current system of distribution embodying my invention and Figs. 2 and 3 illustrate modifications of a portion of the system shown in Fig. 1.

Referring to the distribution system shown in Fig. 1, 1 represents a polyphase network which is arranged to be supplied with current from a plurality of supply circuits 2 and 3 by means of the polyphase feeder circuits 4 and 5 respectively. While I have shown separate supply circuits 2 and 3, it is evident that both of the feeder circuits 4 and 5 may be connected to the same supply circuit. Furthermore while I have shown my invention in connection with polyphase feeder circuits, it is obvious it is applicable to alternating current feeder circuits having any number of phases.

Each feeder circuit includes a power transformer located adjacent to the network 1 and a suitable switch 7 located adjacent to the supply circuit for connecting the primary of the transformer to the supply circuit. This switch 7 may be controlled in any suitable manner, examples of which are well known in the art. A suitable network switch 8 is also provided in each feeder circuit for connecting the secondary of the transformer 6 to the network 1. Each feeder circuit also has associated therewith a suitable voltage regulating device, such as an automatically controlled induction regulator, a transformer tap changing device, etc., examples of which are well known in the art, for regulating the feeder voltage so that the voltage at the network end of the feeder circuit is maintained substantially constant at a predetermined value under all load conditions. In the particular arrangement shown in the drawing, I have shown a motor operated polyphase induction regulator 9 for accomplishing this result.

Each induction regulator 9 has suitable control means associated therewith for controlling the operation thereof so that when the associated feeder circuit is energized, the voltage at the network end of the feeder circuit is maintained at a predetermined value. In order to simplify the disclosure I have shown in the drawing only the control means associated with the regulator 9 in the feeder circuit 4. It is to be understood, however, that the regulator 9 in the feeder circuit 5 may be provided with a similar control arrangement. As shown, the control means for the regulator 9 in feeder circuit 4 includes a voltage relay 10 connected in any suitable manner to the feeder circuit 4 so that the relay 10 is energized in accordance with the voltage at the network end of the feeder circuit. When the network end voltage of the feeder circuit is below a predetermined value, the relay 10 is arranged to complete an energizing circuit for a control relay 15 which, in turn, completes an energizing circuit for the armature 12 and field winding 16 of a motor 14 which is arranged to adjust the position of the regulator 9. When the armature 12 and field winding 16 of the motor 14 are energized, the regulator is operated in a direction to increase the voltage of the network end of the feeder circuit to the desired value. When the network end voltage of the feeder circuit 4 is above the desired value, the relay 10 is arranged to complete an energizing circuit for a control relay 11 which, in turn, completes an energizing circuit for the armature 12 and field winding 13 of the regulator motor 14 so that the regulator is operated in a direction to decrease the feeder circuit voltage to the desired value.

Each network switch 8 is provided with suitable control means for effecting the closing thereof in response to predetermined voltage conditions of the associated feeder circuit and for effecting the opening of the switch under certain predetermined reverse power conditions. In order to simplify the disclosure, only the control means for the switch 8 in the feeder circuit 4 is shown in the drawing.

In the embodiment of the invention shown in Fig. 1, the network switch 8 in the feeder 4 is arranged to be closed in response to three-phase voltage of a definite value and having a predetermined phase rotation. This result is obtained by connecting to the feeder circuit 4 a polyphase voltage and reverse phase relay 17 of any suitable type, examples of which are well known in the art, and arranging the relay 17 so that, when the polyphase voltage at the network end of the feeder circuit has the proper phase rotation and magnitude and the switch 8 is open, it effects the operation of a suitable closing mechanism to close the switch 8. As shown, the relay 17, when it closes its contacts 18, is arranged to effect the operation of a suitable timing device 19 which, after it has operated for a predetermined time, completes an energizing circuit for the closing coil 42 of the switch 8. The timing device 19 is preferably arranged in any suitable manner, examples of which are well known in the art, so as to limit the number of times the switch 8 can be closed under conditions which cause it to open immediately after it is closed. In the particular embodiment shown in the drawing, this result is accomplished by means of a notching relay 20, the operating coil of which is connected in parallel with the operating coil of the timing device 19 through contacts 24 of device 19. This relay 20 is arranged in a manner well known in the art to open contacts 21 in the circuit of both of the windings 19 and 20 if the notching relay is energized a predetermined number of times with less than a predetermined time interval between each deenergization of the winding of relay 20 and the subsequent energization thereof. The contacts 21 are arranged in any suitable manner so that they remain open until they are reset by hand.

Usually in practice, the value of voltage to which the voltage relay 17 responds is less than the normal value to which the relay 10 responds. Therefore, in order to permit the regulating means to adjust the feeder circuit voltage to the desired value, after the feeder circuit is energized, and then have the voltage remains at said desired voltage for a predetermined time before the switch 8 is closed, I provide, in accordance with my invention, an arrangement for preventing the closing coil 42 from being energized until after the voltage regulating means has remained idle for a predetermined time. In this manner, the switch 8 cannot be closed until after the feeder circuit voltage at the network end has remained at a predetermined value for a predetermined time. In the arrangement shown in Fig. 1, this result is accomplished by including in the circuit of the operating coil 70 of the timing device 19 the contacts 22 and 23 of the control relays 11 and 15 respectively. Since these contacts are closed only when the respective relays are deenergized, the switch 8 can be closed only while the regulator 9 is at rest and after the voltage of the network has remained at the desired value for a predetermined time.

In order to effect the opening of the network switch 8 in response to a reversal of power through the switch, two power directional relays 25 and 26 are connected to each phase of the feeder circuit in any suitable manner, examples of which are well known in the art, so that they operate to close their respective contacts when the power in the respective phases flows from the network to the feeder circuit. As shown, each of these relays is arranged to complete an energizing circuit for the trip coil 27 of the switch 8 when the power reverses. The relays 25 are set to respond to a relatively small value of reverse power and are also arranged in any suitable manner so that they do not effect the closing of their respective contacts until the power reversal to which they respond has lasted for a predetermined time interval. This delay in the closing of the contacts is provided in order that a momentary small reversal of power does not effect an unnecessary opening of the switch 8. The relays 26 are arranged to respond to relatively high values of reverse power in the respective phases and are arranged to respond substantially instantaneously. These relays 26 are provided to protect against short-circuits on the feeder circuit and in the transformer.

After the switch 8 closes, there is a possibility that a circulating current may flow through the feeder circuit 4 until the voltage regulating means has had sufficient time to operate and adjust the voltage so as to prevent the circulating current from flowing. This circulating current may be of the proper magnitude and direction in the feeder circuit 4 to effect the operation of the reverse power relays 25. In accordance with my invention, I provide an arrangement for preventing such a circulating current from affecting the opening of the switch 8. I accomplish this result by rendering the relays 25 inoperative to effect the opening of the switch 8 for a predetermined time after it is closed. In the embodiment of my invention shown in Fig. 1, I accomplish this result by providing the switch 8 with auxiliary contacts 29 which respectively short-circuit the current windings of different reverse power relays when the switch 8 is open and which are arranged in any suitable manner, examples of which are well known in the art, so that they are not opened until after the main contacts of the switch 8 have been closed for a predetermined time. In this manner the regulating means has sufficient time to adjust the regulator so as to stop the circulating current from flowing before the relays 25 are rendered operative to effect the opening of the switch 8.

The operation of the arrangement shown in Fig. 1 is as follows:

When the network 1 is being supplied with current through the feeder circuit 5 and it is desired also to supply current to the network through the feeder circuit 4, the primary switch 7 in the feeder circuit 4 is closed in any suitable manner to connect the primary winding of the transformer 6 to the supply circuit 2. When the polyphase secondary voltage of the transformer 6 has the proper phase rotation and magnitude, the relay 17 closes its contacts 18 in the energizing circuits for the time relay 19. This relay, however, is not energized if the voltage at the network end of the feeder circuit is not at the desired value. If the voltage at the network end is below the predetermined value, the contacts 31 of the voltage relay 10 are closed and a circuit is completed for the control relay 15 across one phase of the feeder circuit 4. The relay 15, by opening its contacts 23, interrupts the energizing circuit for the time relay 19 and, by closing its contacts 32, completes an energizing circuit for the regulator motor 14 so that the regulator 9 is adjusted in a manner to increase the voltage at the network end of the feeder circuit. If the feeder circuit voltage is too high, the contacts 33 of the voltage relay 10 are closed and an energizing circuit is completed for the control relay 11 across one phase of the feeder circuit. The relay 11, by opening its contacts 22, interrupts the energizing circuit for the time relay 19 and, by closing its contacts 34, completes an energizing circuit for the regulator motor 12 so that the regulator 9 is operated in a manner to decrease the voltage in the network end of the feeder circuit. When the voltage at the network end of the feeder circuit 4 is at the desired value, both of the control relays 11 and 15 are deenergized and an energizing circuit is completed for the winding of the time relay 19. This circuit includes the auxiliary contacts 36 on the switch 8, contacts 18 of the voltage relay 17, contacts 21 of the notching relay 20, contacts 22 of the control relay 11 and the contacts 23 of the control relay 15. If the voltage at the network end of the feeder circuit remains at the desired value for a predetermined time, the time relay 19 closes its contacts 37 and contacts 24, and completes, through the auxiliary contacts 38 on the switch 8, an energizing circuit for the closing coil 42 to effect the closing of the switch 8. The closing of contacts 24 of the time delay relay 19 connects the winding of notching relay 20 in parallel with the winding of timing relay 19. Preferably contact 24 closes slightly in advance of contact 37. A predetermined time after the main contacts of the switch 8 connect the feeder circuit 4 to the network 1, the auxiliary contacts 29 open to remove the short-circuits from around the current windings of the reverse power relays 25. These relays are now operative to control the opening of the switch 8.

When it is desired to remove the feeder circuit 4 from service, the primary switch 7 is opened in any suitable manner. After the switch 7 is opened, the magnetizing current for the transformer 6 and the charging current for the feeder circuit 4 are obtained from the network 1 so that the reverse power relays 25 operate to close their respective contacts 39 after a time interval. These contacts 39 are connected in parallel so that the closing of any one of them completes, through the auxiliary contacts 40 of the switch 8, an energizing circuit for the tripping coil 27 to effect the opening of the switch 8.

If, while the feeder circuit 4 is in service, a fault occurs on the feeder circuit or in the transformer 6, so that a relatively large amount of reverse power flows through the switch 8, the reverse power relays 26 operate to close their respective contacts 41, which are connected in parallel, before relays 25 can close their contacts 39. The closing of any one of these sets of contacts 41 completes, through the auxiliary contacts 40 on the switch 8, an energizing circuit for the tripping coil 27 to effect the opening of the switch 8.

In case conditions occur which cause the switch 8 to open without causing the switch 7 to open, there is a possibility that the switch 8 may be opened and closed indefinitely if no means is provided to prevent it. In the arrangement shown in Fig. 1, such an operation of the switch 8 is prevented because if the switch 8 is opened and closed a predetermined number of times with less than a predetermined time interval between any opening of the switch and the subsequent closing thereof, the notching relay 20 opens its contacts 21 in the energizing circuit of the time relay 19 and it is impossible to complete this circuit again automatically until the contacts 21 have been reset by hand.

Fig. 2 illustrates a modification of the arrangement shown in Fig. 1 for preventing the reverse power relays 25 from effecting the opening of the switch 8 in response to any reverse power that may flow through the feeder circuit 4 immediately after the switch 8 is closed. This result is accomplished in the arrangement shown in Fig. 2 by connecting the parallel connected contacts 39 of the reverse power relays 25 in series with the contacts 22 and 23 of the control relays 11 and 15 respectively and also in series with the auxiliary contacts 44 which are provided on the switch 8 and which are arranged to be closed a predetermined time after the main contacts of the switch 8 have been closed. With this arrangement an energizing circuit for the trip coil 27 cannot be completed through any of the contacts 39 until after the switch 8 has been closed a predetermined time and the voltage at the network end of the feeder circuit 4 is at a predetermined value so that both of the control relays 11 and 15 are deenergized.

Fig. 3 illustrates a modification of the arrangement shown in Fig. 1 for regulating the voltage at the network end of the feeder circuit 4 prior to the closing of the network breaker 8. Instead of merely adjusting the voltage at the network end of the feeder circuit to a predetermined value, it is adjusted so that it is substantially equal to the network voltage before the network breaker 8 can be closed. The advantage of such an arrangement is that the inrush current, when the breaker 8 closes, is reduced considerably in case of abnormally low voltages on the network 1.

This desired result is accomplished in the arrangement shown in Fig. 3 by providing the voltage balance relay 50 which has one winding 51 connected to one phase of the feeder circuit at the network end thereof and the opposing winding 52 connected to the corresponding phase of the network 1. When the voltage at the network end of the feeder circuit is higher than the network voltage, the relay 50 closes its contacts 53, which are in parallel with the contacts 33 of the voltage relay 10, so that the regulator 9 is operated, in the manner above described in connection with Fig. 1, to decrease the voltage at the network end of the feeder circuit 4. When the voltage at the network end of the feeder circuit is lower than the network voltage, the relay 50 closes its contacts 54, which are connected in parallel with the contacts 31 of the relay 10, so that the regulator 9 is operated to increase the voltage at the network end of the feeder circuit.

In order that the relay 50 may control the regulator 9 only while the network breaker 8 is open and the voltage relay 10 may control the regulator 9 only while the network breaker 8 is closed, the network breaker is provided with the auxiliary contacts 55, 56 and 59, which are closed when the breaker is open, and the auxiliary contacts 57 and 58, which are closed when the breaker is closed. The contacts 55, 56 and 58 are respectively connected in the circuit of the windings 51, 52 and 10. The contacts 59 are connected in series with the contacts 53 and 54 of the relay 50 and the contacts 57 are connected in series with the contacts 31 and 33 of the relay 10. Therefore, it will be seen that when the network breaker 8 is open, only the relay 50 is operative to control the operation of the regulator 9. This relay operates to make the voltage at the network end of the feeder circuit 4 equal to the network voltage. The breaker 8 cannot be closed until after these voltages have remained substantially equal for a predetermined time. When the network breaker 8 closes the relay 50 is rendered inoperative and the relay 10 is rendered operative to maintain thereafter the voltage at the network end of the feeder circuit 4 at a predetermined value.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, two electric circuits, means for interconnecting said circuits, means responsive to a predetermined voltage condition of said circuits for effecting the closing of said interconnecting means, voltage regulating means for maintaining the voltage of one of said circuits at a predetermined value, and means controlled by said voltage regulating means for permitting the closing of said interconnecting means only when said circuit voltage is at said predetermined value.

2. In combination, two electric circuits, means for interconnecting said circuits, means responsive to a predetermined voltage condition of said circuits for effecting the closing of said interconnecting means, voltage regulating means for maintaining the voltage of one of said circuits at a predetermined value, and means controlled by said voltage regulating means for rendering said voltage condition responsive means operative to effect the closing of said interconnecting means only when said regulating means is not in operation to effect a change in the voltage.

3. In combination, an alternating current network, a feeder circuit including a transformer for supplying current to said network, a supply circuit, means for connecting the primary of said transformer to said supply circuit, means responsive to a predetermined voltage condition of the secondary of said transformer for effecting the connection of said secondary to said network, voltage regulating means for maintaining the voltage at the network end of said feeder circuit at a predetermined value, and means controlled by said voltage regulating means for preventing the connection of said transformer secondary to said network while said regulating means is operating to vary the voltage at the network end of said feeder circuit.

4. In combination, an alternating current network, a feeder circuit including a transformer for supplying current to said network, a supply circuit, means for connecting the primary of said transformer to said supply circuit, means responsive to the secondary voltage of said transformer, timing means controlled by said voltage responsive means for effecting the connection of said transformer secondary to said network when the transformer secondary voltage remains above a predetermined value for a predetermined time, voltage regulating means for maintaining the voltage at the network end of said feeder circuit at a predetermined value, and means controlled by said voltage regulating means for removing said timing means from the control of said voltage responsive means while said regulating means is operating to vary the voltage at the network end of said feeder circuit.

5. In combination, a polyphase network, a polyphase feeder circuit including a polyphase transformer for supplying current to said network, a polyphase supply circuit, means for connecting the primary of said transformer to said supply circuit, means including a timing device for effecting the connection of the secondary of said transformer to said network after said timing device has been in operation for a predetermined time, control means responsive to a predetermined phase rotation of the secondary voltage of said transformer and to predetermined magnitudes thereof for effecting the operation of said timing device, voltage regulating means for maintaining the voltage at the network end of said feeder circuit at a predetermined value, and means controlled by said regulating means for preventing said control means from effecting the operation of said timing device while said regulating means is operating to vary the voltage of said feeder circuit.

6. In combination, two electric circuits, means for interconnecting said circuits in response to a predetermined voltage condition of said circuits, means responsive to a predetermined condition in one of said circuits for effecting the disconnection of said circuits from each other, and timing means responsive to the operation of said interconnecting means for rendering said disconnecting means inoperative to effect the disconnection of said circuits for a predetermined time interval after said circuits are connected together.

7. In combination, two electric circuits, means for interconnecting said circuits in response to a predetermined voltage condition of said circuits, means responsive to a pre- determined condition in one of said circuits for effecting the disconnection of said circuits from each other, means for regulating the voltage of one of said circuits, and means for rendering said disconnecting means inoperative for a sufficient length of time after the operation of said interconnecting means to allow said regulating means to establish a desired voltage condition of said circuits.

8. In combination, two electric circuits, means for interconnecting said circuits in response to a predetermined voltage condition of said circuits, means responsive to a predetermined reverse power condition in one of said circuits for effecting the disconnection of said circuits from each other, and timing means responsive to the operation of said interconnecting means for rendering said reverse power condition responsive means inoperative to effect the disconnection of said circuits for a predetermined time interval after said circuits are connected together.

9. In combination, two electric circuits, means for interconnecting said circuits in response to a predetermined voltage condition of said circuits, means responsive to a predetermined reverse power condition in one of said circuits for effecting the disconnection of said circuits from each other, means for maintaining the voltage on one of said circuits at a predetermined value, and means for rendering said reverse power condition responsive means inoperative for a sufficient length of time after the operation of said interconnecting means to allow said regulating means to reestablish the desired voltage of said one of said circuits.

10. In combination, two electric circuits, means for interconnecting said circuits in response to a predetermined voltage condition on said circuits, means responsive to a predetermined reverse power condition in one of said circuits for effecting the disconnection of said circuits from each other, means for maintaining the voltage of one of said circuits at a predetermined value, and means for rendering said reverse power condition responsive means inoperative while said regulating means is operating after the operation of said interconnecting means.

11. In combination, an alternating current network, a feeder circuit including a transformer for supplying current to said network, a supply circuit, means for connecting the primary of said transformer to said supply circuit, means for effecting the connection of the secondary of said transformer to said network, regulating means for maintaining the voltage at the network end of said feeder circuit at a predetermined value, means responsive to a predetermined reverse power condition in said feeder circuit for effecting the disconnection of said feeder circuit from said network, and means for rendering said reverse power responsive means inoperative to effect the disconnection of said feeder circuit from said network until said regulating means has adjusted the voltage at the network end of the feeder circuit to said predetermined value after the interconnection of said feeder circuit and network.

12. In combination, an alternating current network, a feeder circuit including a transformer for supplying current to said network, a supply circuit, means for connecting the primary of said transformer to said supply circuit, means responsive to a predetermined voltage condition of the secondary of said transformer for effecting the connection of said secondary to said network, voltage regulating means for maintaining the voltage at the network end of said feeder circuit at a predetermined value, means responsive to a predetermined reverse power condition in said feeder circuit for effecting the disconnection of said feeder circuit from said network, and means controlled by said last mentioned connecting means for rendering said reverse power responsive means inoperative to effect the disconnection of said feeder circuit from said network for a predetermined time after said feeder circuit is connected to said network.

13. In combination, two electric circuits, means for interconnecting said circuits in response to a predetermined voltage condition of said circuits, means responsive to relatively small values of reverse power through one of said circuits for effecting the disconnection of said circuits, additional means responsive to relatively large values of reverse power through said one of said circuits for effecting the disconnection of said circuits, means for maintaining the voltage of one of said circuits at a predetermined value, and means for rendering said first mentioned reverse power responsive means inoperative for a sufficient length of time after said circuits are connected together to allow said regulating means to reestablish the voltage of said one of said circuits to said predetermined value.

14. In combination, an alternating current network, a feeder circuit including a transformer for supplying current to said network, a supply circuit, means for connecting the primary of said transformer to said supply circuit, means responsive to a predetermined voltage condition of the secondary of said transformer for effecting the connection of said secondary to said network, voltage regulating means for maintaining the voltage of the network end of said feeder circuit at a predetermined value, means responsive to relatively small values of reverse power through said feeder circuit for effecting the disconnection of said feeder circuit from said network, additional means responsive to relatively large values of reverse power through said feeder circuit for effecting the disconnection of said feeder circuit from said network, and means controlled by the connection of said feeder circuit to said network for rendering only said first mentioned reverse power responsive means inoperative to effect the disconnection of said feeder circuit from said network until said regulating means has had time to adjust the voltage at the network end of the feeder to said predetermined value after the interconnection of said feeder circuit and network.

15. In combination, an alternating current network, a feeder circuit for supplying current to said network, a supply circuit, means for connecting said feeder circuit to said supply circuit, means for effecting the connection of said feeder circuit to said network, regulating means for maintaining the voltage at the network end of said feeder circuit at a predetermined value, means responsive to a predetermined condition of said feeder circuit for effecting the disconnection of said feeder circuit from said network, and means for rendering said disconnecting means inoperative to effect the disconnection of said feeder circuit from said network until after said regulating means has adjusted the voltage at the network end of the feeder circuit to said predetermined value after the interconnection of said feeder circuit and network.

16. In combination, an alternating current network, a feeder circuit for supplying current to said network, a supply circuit, means for connecting said feeder circuit to said supply circuit, means for effecting the connection of said feeder circuit to said network, regulating means for maintaining the voltage at the network end of said feeder circuit at a predetermined value, means responsive to a predetermined reverse power condition in said feeder circuit for effecting the disconnection of said feeder circuit from said network, and means for rendering said reverse power responsive means inoperative to effect the disconnection of said feeder circuit from said network until said regulating means has adjusted the voltage at the network end of the feeder circuit to said predetermined value after the interconnection of said feeder circuit.

17. In combination, two electric circuits, voltage regulating means for controlling the voltage of one of said circuits, means responsive to a predetermined voltage condition of said circuits for interconnecting said circuits, and means controlled by said regulating means for permitting the operation of said interconnecting means only after said regulating means has not been in operation for a predetermined time to effect a change in the voltage of said one of said circuits.

18. In combination, an alternating current network, a feeder circuit for supplying current to said network, a supply circuit, means for connecting said feeder circuit to said supply circuit, means for effecting the connection of said feeder circuit to said network, regulating means for controlling the voltage at the network end of said feeder circuit, means responsive to a predetermined condition of said feeder circuit for effecting the disconnection of said feeder circuit from said network, and means for rendering said disconnecting means inoperative until said regulating means has established a predetermined voltage at the network and of said feeder circuit after the connection thereof to the network.

19. In combination, an alternating current network, a feeder circuit for supplying current to said network, a supply circuit, means for connecting said feeder circuit to said supply circuit, means for effecting the connection of said feeder circuit to said network, regulating means for controlling the voltage at the network end of said feeder circuit, means responsive to a predetermined condition of said feeder circuit for effecting the disconnection of said feeder circuit from said network, means for rendering said disconnecting means inoperative until said regulating means has established a predetermined voltage at the network end of said feeder circuit after the connection thereof to the network, and means responsive to another predetermined condition of said feeder circuit for effecting at any time the disconnection of said feeder circuit from said network.

In witness whereof, I have hereunto set my hand.

ARVID E. ANDERSON.